United States Patent Office 3,211,710

Patented Oct. 12, 1965

3,211,710

PROCESS FOR IMPROVING THE MECHANICAL PROPERTIES OF POLYMERS OR COPOLYMERS

Hendrik Hendriks and Cornelis E. P. V. van den Berg, Geleen, Netherlands, assignors to Stamicarbon N.V., Heerlen, Netherlands No Drawing. Filed Feb. 14, 1961, Ser. No. 89,121
Claims priority, application Netherlands, Feb. 20, 1960, 248,646
4 Claims. (Cl. 260—85.3)

The present invention relates to a process for improving the mechanical properties of polymers of monomers containing more than one double bond, such as butadiene, isoprene, chloroprene, allene, etc., or of random-copolymers thereof with monomers containing only one double bond, such as ethene, propene, n-butene, styrene, etc.

To prepare these polymers use can be made of the so-called Ziegler catalysts. Use can also be made of a catalyst containing chromium oxide on a carrier or, for example, of a catalyst containing molybdenum oxide on a carrier.

In the non-prepublished Netherlands patent application 247,903 there is described a process for improving the mechanical properties of polymers of monomers containing only one double bond, the said process consisting in that an active Ziegler catalyst is made to act, in the absence of monomers, on a suspension or a solution of the polymer in a liquid distributing agent.

The present invention aims at providing a process by means of which the mechanical properties of the polymers or copolymers mentioned in the introductory paragraph of the present specification can be improved. A special aim of the invention is to provide a process by means of which the mechanical properties of the so-called Ziegler copolymers of ethylene with less than 50 mol.-percent of alkadienes, such as butadiene, can be improved. In addition, the present invention provides a particularly simple modification of the so-called Ziegler polymerisation, which can be easily realized on a technical scale and permits the production of polymers of improved mechanical properties. Other advantages of the invention will be pointed out hereinafter.

The process according to the invention for improving the mechanical properties of polymers of monomers containing more than one double bond, or of copolymers thereof with monomers containing only one double bond, is characterized in that an active Ziegler catalyst is made to act on the polymers or copolymers in the absence of monomers. During this action the polymers or the copolymers can, for example, be dispersed, i.e. dissolved or suspended, in a liquid distributing agent, such as hexane, heptane, cyclohexane, gasolene, kerosene, benzene, toluene, xylene, tetralin, decalin, or, for example, chlorobenzene.

By the term "Ziegler catalysts" as used in the present specification and in the appended claims, is to be understood catalyst that are capable of polymerizing ethylene at atmospheric pressure into a product solid at room temperature, and which catalysts have been formed by mixing at least one compound of a metal belonging to groups 4 to 8 of the periodic system, inclusive of thorium and uranium, with a metal, alloy, metal hydride, or organo metallic compound of a metal belonging to groups 1 to 3 of the periodic system and if so desired in the presence of other substances, such as aluminum chloride. By an "active Ziegler catalyst" is to be understood a non-spent Ziegler catalyst, hence a catalyst that, in the presence of a monomer, such a ethylene, causes a rise in temperature under adiabatic conditions.

The improvements of the mechanical properties occur when the active Ziegler catalyst acts on the polymer or the copolymer in the absence of a monomer. This does not imply that the monomer will have to be absent from the very outset. Any monomer present at the outset, is polymerized under the influence of the Ziegler catalyst, which causes the monomer to disappear completely or almost completely. The action of the Ziegler catalyst on the polymer or copolymer, which is so favorable to the mechanical properties, then sets in.

The temperature during the action can be varied within very wide limits. At room temperature, however, the action takes so much time that it is hardly attractive from a technical point of view. Therefore, the action is preferably made to take place at a temperature above 60° C. for more than 2 minutes. It is advantageous to have the action proceed in temperatures of between 70 and 90° C. for 4 to 60 minutes. The action can also be continued for a longer period, but in most cases this gives any, or hardly any, additional improvement of the mechanical properties.

To improve the mechanical properties of polymers or copolymers prepared with a Ziegler catalyst, the process according to the invention can be simply applied to the solution or suspension obtained in the polymerization. This can be effected by adding an active Ziegler catalyst to the said solution or suspension, or, if only one of the catalyst components has been spent, by adding this catalyst component.

Preferably, however, the polmerization is carried out with so much Ziegler catalyst that after completion of the polymerization, there is obtained a suspension or a solution which still contains active Ziegler catalyst. This suspension or solution is subsequently kept at the desired temperature for the desired time, generally at a temperature somewhat higher than that at which the polymerization was carried out. Subsequently, the catalyst is deactivated, preferably by adding an alcohol to the solution or suspension in the usual way and at the desired moment. Owing to this simple modification of the known continuous or discontinuous Ziegler polymerization and to the use of a little more catalyst than is strictly necessary for this polymerization, there are obtained polymers or copolymers of appreciably better mechanical properties. The process according to the invention can also be carried out by interrupting the supply of the monomer or monomers to the suspension or solution, or to part thereof, for a sufficient length of time during the polymerization.

It is especially advantageous to apply the process according to the invention to Ziegler copolymers of ethylene with less than 50 mol.-percent, in particular with less than 10 mol.-percent, al alkadienes, such as butadiene.

The greatest improvement of the mechanical properties is obtained if the Ziegler catalyst acting on the copolymer contains tetravalent titanium, preferably more than 50 mol.-percent of tetravalent titanium in relation to trivalent titanium.

The polymers treated according to the invention show a lower degree of unsaturation than the original polymers. It is remarkable that not only the number of terminal and lateral double bonds, but also the number of internal (trans-) double bonds of the polymer is reduced by the treatment according to the invention. This is surprising as, in general, Ziegler catalysts are only capable of polymerizing substances with terminal double bonds. It is also surprising that the inherent viscosity of the polymer or copolymer is not, or only slightly, changed by the treatment, while the density becomes a little lower.

The process according to the invention can also be applied to polymers or copolymers prepared with for example, chromium oxide or molybdenum oxide or peroxide, etc. The process according to the invention can also be included in the method of preparation usual for this purpose. Thus, a Ziegler catalyst can be added to the solution obtained by polymerizing a mixture of ethylene and butadiene with chromium oxide, and by keeping the polymer solution at the desired temperature for the desired time. The process according to the invention can also be carried out by treating the unsaturated polymers or copolymers with a Ziegler catalyst during their final formation. If so desired, a gas can be present during this formation, thereby causing a foamy product to be formed. It is advantageous to use a catalyst soluble in hydrocarbons, such as bis(cyclopentadienyl-) tianium dichloride and titanium tetrachloride.

The process according to the invention can also be carried out by making Ziegler catalysts act, in the absence of monomers, on mixtures of polymers and/or copolymers, e.g. on a mixture of an ethylene-propylene copolymer and polybutadiene.

Use can also be made of polymers or copolymers containing, besides carbon and hydrogen, other elements, such as silicon.

The invention will be illustrated with reference to the following example. By "impact strength" as used herein, is to be understood the energy absorption in kg./cm.$^2$ according to standard specification DIN 534,453, see DIN Taschenbuch 21, October 1955, page 251, No. 3.1, measured on a "Dynstat-Probe" test piece of 1.6 mm. thickness. The test piece has been made by compression, the cooling rate being about 40° C. per minute. The number of double carbon bonds was determined by measuring the absorption intensities in the infrared spectrum at 10.3$\mu$ (internal-trans), 11.0$\mu$ (terminal), and 11.25$\mu$ (lateral). The necessary extinction coefficients were determined by means of model substances containing these double bonds. The inherent viscosity fas measured at 135° C. in decalin of a concentration of 100 mg. per litre.

*Example 1*

About 150 grams of copolymer obtained from a mixture of ethylene and about 1% by volume of propadiene by means of a Ziegler catalyst and having an inherent viscosity of 1.0, a density ($D_4^{23}$) of 0.9479, and an impact strength of 14 was suspended in 1 litre of heptane. Subsequently, 3 mmoles of di-isobutyl aluminium hydride and 2 mmoles of titanium tetrachloride were added to the suspension under oxygen- and water-free conditions. The suspension was then heated at 80° C. for 60 minutes. After the usual processing, the treated copolymer showed an inherent viscosity of 1.3 and a density of 0.9458. The impact strength had increased to 32, while in the determination of the impact strength no rupturing was noted. For purposes of comparison it should be mentioned that, a plate compressed in the same way from the original product already snapped on manual bending.

*Example 2*

A copolymer obtained from a mixture of ethylene and about 5% by weight of hexadiene-1,5 by means of a Ziegler catalyst and having an intrinsic viscosity of 1.6, a density of 0.9503, and an impact strength of 10 was treated as described in Example 1. The treated copolymer showed an intrinsic viscosity of 1.7, a density of 0.9481, and an impact strength of 22.

*Example 3*

A copolymer obtained from a mixture of ethylene and about 1% by volume of butadiene by means of a Ziegler catalyst and having an inherent viscosity of 0.8 and degrees of unsaturation in the sequence of internal-terminal-lateral of 0.19, 0.04 and 0.03 double bonds per 100 carbon atoms, was treated as described in Example 1 (120 minutes, 80° C.). The treated copolymer showed an inherent viscosity of 1.4 and degrees of unsaturation in the said sequence, of 0.10, 0.02 and 0.02 double bonds per 100 carbon atoms. Consequently, the number of internal double bonds has also been strongly increased.

We claim:

1. Process for improving the mechanical properties of a copolymer of ethylene and an alkadiene containing from 1 to 10 mol percent of said alkadiene comprising the step of acting on a suspension of said copolymer in a liquid distribution agent with an active catalyst containing an organo aluminum compound and tetravalent titanium for at least 2 miuntes at a temperature of above 60° C. in the absence of the monomers of said copolymer.

2. Process according to claim 1, wherein the action is carried out at a temperature within the range of 70°–90° C. for a period within the range of 4–60 minutes.

3. Products prepared by the process according to claim 1.

4. Molded articles, containing products according to claim 3.

References Cited by the Examiner

UNITED STATES PATENTS

| | | | |
|---|---|---|---|
| 2,846,427 | 8/58 | Findlay | 260—85.3 |
| 2,868,772 | 1/59 | Ray et al. | 260—94.3 |
| 2,970,133 | 1/61 | Sistrunk | 260—93.7 |
| 2,988,543 | 6/61 | Meyer | 260—93.7 |

FOREIGN PATENTS

| | | |
|---|---|---|
| 551,851 | 4/57 | Belguim. |
| 804,083 | 11/58 | Great Britain. |

JOSEPH L. SCHOFER, *Primary Examiner.*

MORRIS LIEBERMAN, *Examiner.*